United States Patent [19]
Kim

[11] Patent Number: 5,337,196
[45] Date of Patent: Aug. 9, 1994

[54] STEREO/MULTIVOICE RECORDING AND REPRODUCING VIDEO TAPE RECORDER INCLUDING A DECODER DEVELOPING A SWITCH CONTROL SIGNAL

[75] Inventor: Sang-uk Kim, Seoul, Rep. of Korea

[73] Assignee: Samsung Electronics Co., Ltd., Kyunggi-do, Rep. of Korea

[21] Appl. No.: 829,104

[22] Filed: Jan. 31, 1992

[30] Foreign Application Priority Data

Jan. 31, 1991 [KR] Rep. of Korea ............... 91-1892

[51] Int. Cl.$^5$ ............... G11B 20/06; H04N 7/04; H04N 5/60; H04H 5/00
[52] U.S. Cl. ............... 360/30; 381/3; 381/4; 381/13; 348/485; 348/738
[58] Field of Search ............... 358/144, 143, 198; 360/30, 27, 29, 46, 61, 64, 33.1; 381/3, 4, 13

[56] References Cited

U.S. PATENT DOCUMENTS

| | | | |
|---|---|---|---|
| 4,716,589 | 12/1987 | Matsui | 358/144 X |
| 4,866,775 | 9/1989 | Katakura . | |

FOREIGN PATENT DOCUMENTS

| | | | |
|---|---|---|---|
| 087303 | 8/1983 | European Pat. Off. . | |
| 3237901 | 2/1990 | Fed. Rep. of Germany . | |
| 58-166884 | 10/1983 | Japan | 381/3 |
| 2218300 | 8/1990 | Japan | 381/13 |

OTHER PUBLICATIONS

Radio-Electronics—Service Clinic, Jack Darr, pp. 88-89, Jun., 1985.
IEEE Transactions on Consumer Electronics, vol. 34, No. 3, dated Aug., 1988, BTSC TV Multichannel Sound Decoder Including Digital Expander, pp. 634-641.

Primary Examiner—John Shepperd
Assistant Examiner—Patrick Wamsley
Attorney, Agent, or Firm—Sughrue, Mion, Zinn, Macpeak & Seas

[57] ABSTRACT

A stereo/multivoice recording and reproducing apparatus used for a high fidelity video tape recorder comprises a multi-channel television system (MTS) decoder for demodulating stereo and multivoice signals included in an IF signal supplied from a tuner, a high fidelity audio processor for frequency-modulating the stereo signal output from a MTS decoder, left and right channel heads for recording the stereo signal frequency-modulated in the high fidelity audio processor, a second audio processor for amplifying the multivoice signal from the MTS decoder, and a third audio head for recording the multivoice signal amplified in the second audio processor. According to one aspect of the invention, the apparatus can simultaneously record stereo and multivoice signal and selectively reproduce one of the stereo signal and the multivoice signal.

20 Claims, 4 Drawing Sheets

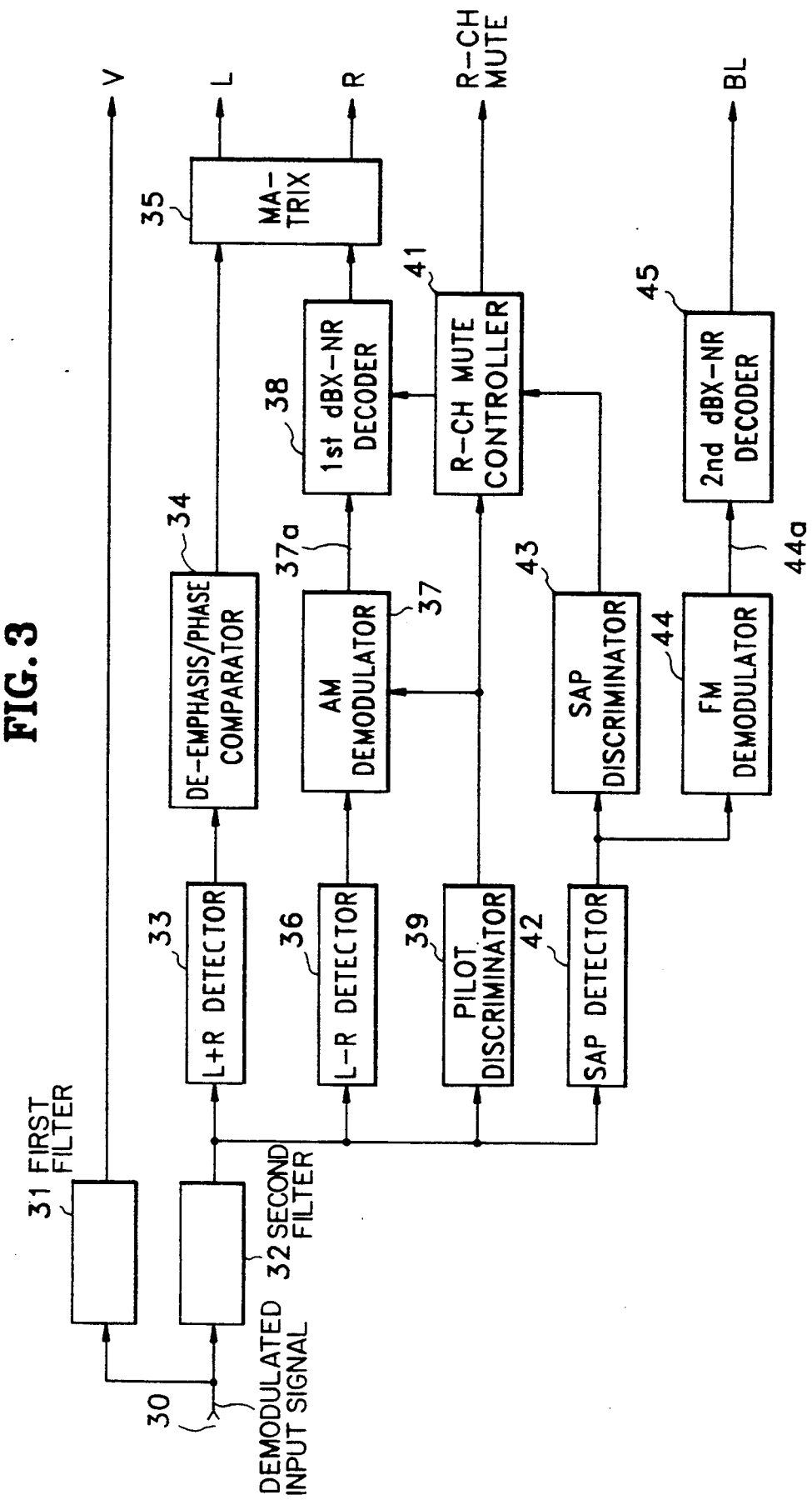

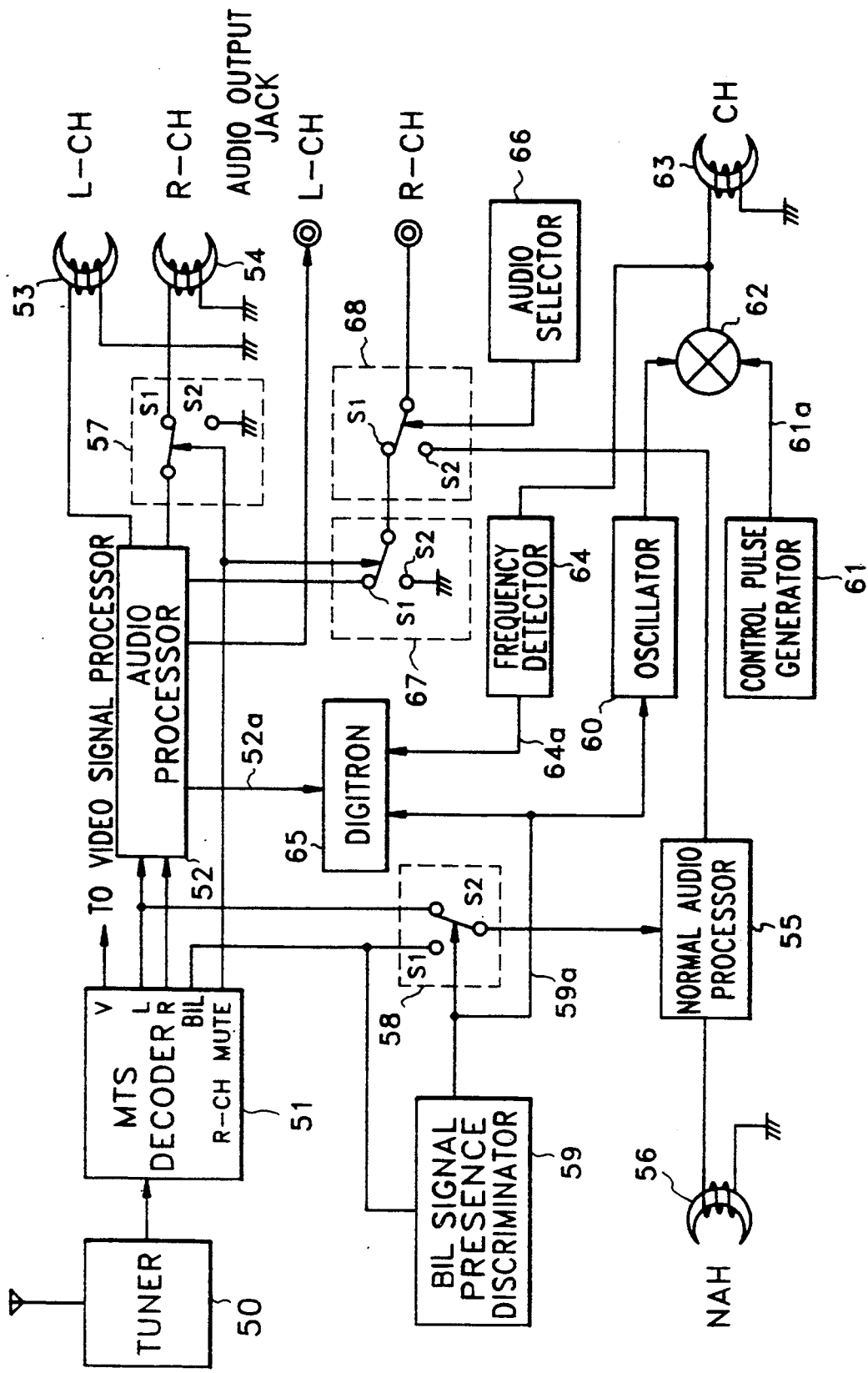

STEREO/MULTIVOICE RECORDING AND REPRODUCING VIDEO TAPE RECORDER INCLUDING A DECODER DEVELOPING A SWITCH CONTROL SIGNAL

FIELD OF THE INVENTION

The present invention relates to a stereo/multivoice recording and reproducing apparatus for a high fidelity video tape recorder (VTR) and, more particularly, in a multi-channel television system (MTS), to an apparatus for faithfully recording stereo and multivoice signals using an MTS decoder for simultaneously demodulating the stereo and multivoice signals, and for reproducing the recorded stereo and multivoice signals.

BACKGROUND OF THE INVENTION

In an American multivoice system (ZENITH system) which is ordinarily called an MTS system, an audio signal consists of a stereo subchannel, which is AM-modulated to $2f_H$ (twice the horizontal synchronous frequency), a second audio program (SAP) signal FM-modulated to $5f_H$ and a pilot signal for stereo broadcast recognition, as well as an audio signal (stereo main channel) of an existing TV system. A characteristic advantage of the American system is that various audio signals can be available since each signal has a different carrier frequency. In other words, when stereo and bilingual broadcasts are simultaneously transmitted from a station, the system allows a consumer to select a desired audio signal.

A video cassette recorder (VCR) for receiving and recording/playing back the audio signal of the MTS system incorporates an MTS decoder for demodulating an MTS signal into stereo and SAP signals prior to recording the demodulated signals on tape. In a high fidelity video tape recorder (VTR), the recording tape has two audio recording regions, i.e., a high fidelity track and a normal audio track. The stereo signal is recorded on the high fidelity track while the SAP signal is recorded on the normal audio track. During reproduction, the stereo or multivoice signal is separately selected by a user. However, the conventional MTS decoder commonly uses a decoder for SAP and stereo signals and decodes information about the selected one of these two signals according to the detection of a pilot signal, which acts as a reference signal. The system then records the decoded information onto a recording medium via a high fidelity audio processor. Since it is impossible to record the stereo and SAP signals simultaneously, the original sound itself cannot be recorded during multibroad-cast when a signal transmitted from the station simultaneously generates the stereo and SAP signals. Accordingly, during reproduction of the recorded program, one signal of the two broadcast signals is omitted.

SUMMARY OF THE INVENTION

Therefore, it is an object of the present invention to provide an apparatus for simultaneously demodulating stereo and multivoice signals in the MTS system.

It is another object of the present invention to provide an apparatus for generating a mute signal in the absence of a stereo signal in a stereo/multivoice demodulator for the MTS system.

It is still another object of the present invention to provide a stereo/multivoice recording and reproducing apparatus using the stereo/multivoice demodulator in a high fidelity VTR.

It is yet another object of the present invention to provide an apparatus for interrupting an audio signal supplied to a right channel head when receiving a mono broadcast, in a stereo/multivoice recording and reproducing apparatus for a high fidelity VTR.

It is still another object of the present invention to provide an apparatus for simultaneously recording an additional signal which displays the presence of stereo or multivoice signal during reproduction in an stereo/multivoice recorder for high fidelity VTR.

It is an additional object of the present invention to provide an apparatus for faithfully reproducing stereo/multivoice signals recorded on tape in the high fidelity VTR.

It is still a further object of the present invention to provide an apparatus for determining the presence of stereo and multivoice signals when recording the stereo and multivoice signals in the high fidelity VTR.

To accomplish these and other objects of the invention, a MTS decoder according to the present invention comprises:

a first filter for filtering a frequency component including luminance and chrominance signals from an input demodulated signal;

a second filter for filtering a frequency component including a stereo main signal, a stereo subsignal, a pilot signal and a SAP signal from the input demodulated signal;

a L+R detector for extracting a frequency component including the stereo main signal from the output of the second filter;

a de-emphasis/phase comparator for demodulating the stereo main signal from the output of the L+R detector;

a L-R detector for extracting a frequency component including the stereo subsignal from the output of the second filter;

an AM demodulator controlled in response to the output of a pilot discriminator for demodulating the stereo subsignal from the output of the L-R detector;

a first noise reduction decoder for removing noise from the output of the AM demodulator;

a matrix circuit for receiving the outputs of the de-emphasis/phase comparator and the first noise reduction decoder so as to generate left and right stereo signals;

a SAP detector for extracting a frequency component including a SAP signal from the output of the second filter;

a FM demodulator for demodulating a multivoice signal from the output of the SAP detector;

a second noise reduction decoder for removing noise from the output of the FM demodulator;

a SAP discriminator for generating a signal which shows the presence or absence of the SAP signal by inspecting the output of the SAP detector;

a pilot discriminator for generating the signal indicating the presence or absence of the pilot signal by inspecting the output of the second filter; and a controller for receiving the outputs of the SAP and pilot discriminators so as to generate a mute signal.

These and other objects, features and advantages of the present invention are provided by a stereo/multivoice recording and reproducing apparatus using the MTS decoder according to the present invention, in a high fidelity VTR including a tuner, a high fidelity audio processor, a second audio processor and a digitron. The recording and reproducing apparatus comprises:

an MTS decoder for generating a stereo signal, a multivoice signal and a mute signal based on an input demodulation signal;

a right channel head switch positioned between a high fidelity audio processor and a right channel head and controlled by the mute signal output from the MTS decoder for interrupting the transmission of a frequency-modulated audio signal to the right channel head;

a right channel audio switch positioned between the high fidelity audio processor and a right channel audio output device and controlled by the mute signal output from the MTS decoder for interrupting the transmission of an audio signal to the right channel audio output device;

a BIL signal discriminator for inspecting the BIL output from the MTS decoder to generate a signal which decides the presence or absence of a BIL signal;

an audio signal switch positioned between the MTS decoder and the second audio processor for switching the left channel stereo signal and the BIL signal output by the MTS decoder according to the output of the BIL signal discriminator to supply the outputs to the second audio processor;

an oscillator controlled by the output of the BIL signal discriminator for outputting an oscillation signal having a predetermined frequency;

a mixer for mixing the oscillator's output and control pulses and for supplying the result to a control head;

a frequency detector for inspecting a reproduced control signal from the control head during reproduction so as to generate a BIL signal presence determining signal if the recorded oscillation signal from the oscillator is present;

a digitron for receiving a stereo signal presence deciding signal from the high fidelity audio processor and the outputs of the BIL signal discriminator and the frequency detector, to display the presence of stereo and multivoice signals via segments;

an audio select controller for receiving a user's selection designating one of the stereo and multivoice signals; and an audio switch for interrupting the transmission of an audio signal supplied from the second audio processor during playback to a right channel audio output by the output of the audio select controller.

BRIEF DESCRIPTION OF THE DRAWINGS

The above objects and other advantages of the present invention will become more apparent by describing in detail a preferred embodiment of the present invention with reference to the attached drawings, in which:

FIG. 3 is a block diagram of one embodiment of an MTS decoder of the present invention; and FIG. 4 is a block diagram of a stereo/multivoice recording and reproducing apparatus using the MTS decoder of FIG. 3.

DESCRIPTION OF THE PREFERRED EMBODIMENTS

Figure 1:
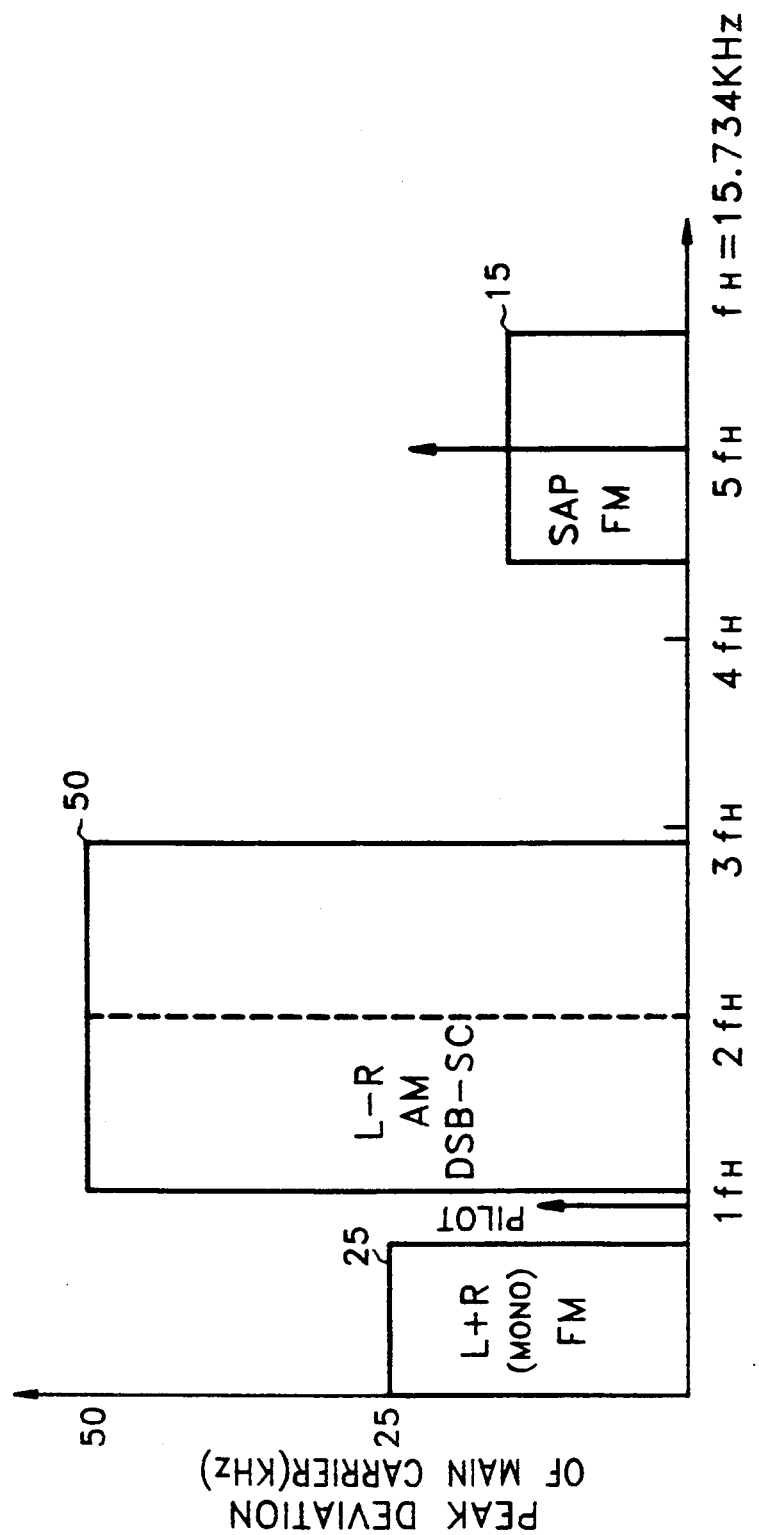
FIG. 1 shows the frequency spectrum of the MTS system.

FIG. 1 shows the frequency spectrum of stereo and multivoice signals employed in the MTS system.

Figure 2:
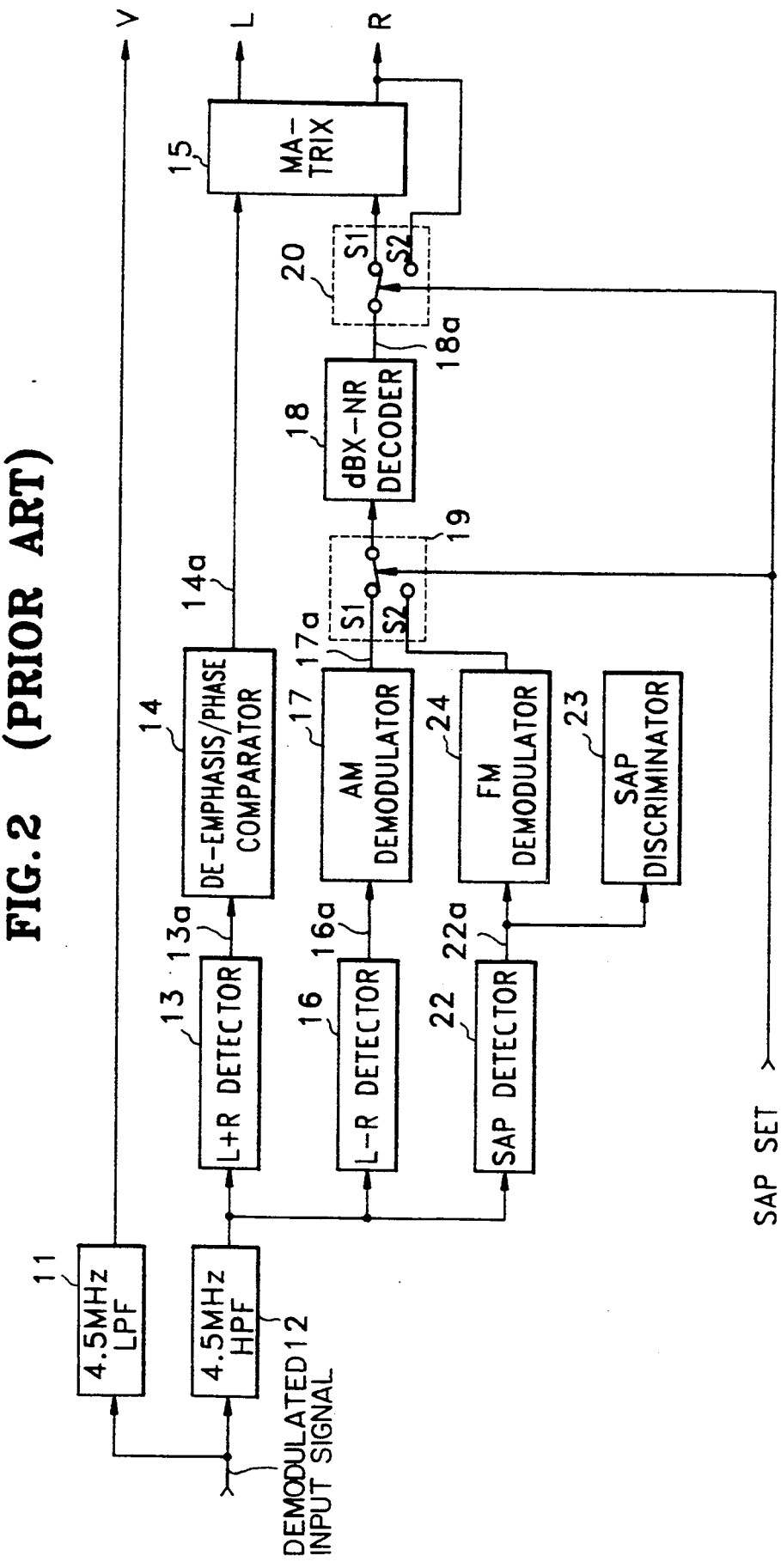
FIG. 2 is a block diagram of a conventional MTS decoder.

In FIG. 2, reference numeral 11 represents a 4.5 MHz cut-off low pass filter (LPF), 12 is a 4.5 MHz cut-off second filter (HPF), 13 is a L+R detector, 14 is a de-emphasis/phase comparator, 15 is a matrix circuit, 16 is a L-R detector, 17 is an AM demodulator, 18 is a noise reduction (hereinafter dBX-NR) decoder, 22 is a SAP detector, 23 is a SAP discriminator, 24 is a FM demodulator, and 19 and 20 are switches.

Referring to FIG. 2, a broadcast signal of a channel selected by a tuner (not shown) among broadcast signals transmitted via an antenna is converted into demodulated signal and supplied to LPF 11 and HPF 12. The IF signal includes luminance and chrominance signals having a 4.5 MHz bandwidth and an audio signal above the luminance and chrominance frequencies. Luminance and chrominance signals, generally denoted V, are filtered by LPF 11 and are then supplied to a video signal processor (not shown).

Meanwhile, the audio signal is filtered by HPF 12 and supplied to a L+R detector 13, a L-R detector 16 and a SAP detector 22. A stereo main signal included in the audio signal is filtered by L+R detector 13 and supplied to de-emphasis/phase comparator 14. As shown in FIG. 1, the stereo main signal occupies the frequency region corresponding to a TV audio signal and is frequency modulated. As is the case in ordinary frequency modulation, a pre-emphasis operation is performed on the stereo main signal before transmission. A detected stereo main signal 13a is demodulated into a L+R signal 14a by de-emphasis/phase comparator 14 and is supplied to one input of a matrix circuit 15.

A stereo subsignal included in the audio signal is filtered by L-R detector 16 to be supplied to an AM demodulator 17. As shown in FIG. 1, the stereo subsignal occupies a frequency region having a higher center frequency than that of a TV audio signal by one $f_H$ and is amplitude modulated. A detected stereo subsignal 16a is demodulated into a L-R signal 17a by AM demodulator 17 and is supplied to one input S1 of switch 19.

A SAP signal included in the audio signal is filtered by SAP detector 22 and is supplied to SAP discriminator 23 and FM demodulator 24. SAP discriminator 23 detects the presence of the SAP signal and outputs a signal to signify the presence or absence of the SAP signal. As shown in FIG. 1, a detected SAP signal 22a occupies a frequency region with a higher center frequency than that of a TV audio by $5f_H$ and is frequency modulated. The detected SAP signal 22a is demodulated by FM demodulator 24 and is supplied to the other input S2 of switch 19. The signal selected by switch 19 is supplied to dBX-NR decoder 18, which removes noise from the selected one of the input signals. The dBX-NR decoder output 18a is supplied to the other input of matrix circuit 15 by switch 20.

Matrix circuit 15 receives stereo main signal 14a demodulated by de-emphasis/phase comparator 14 and stereo subsignal 18a demodulated by AM demodulator 17 for generating left and right stereo signals stereo-L and stereo-R, respectively. The operation principle of matrix circuit 15 is as follows:

$$L = \frac{(L+R) + (L-R)}{2}$$

$$R = \frac{(L+R) - (L-R)}{2}$$

Switches 19 and 20 are operated in response to a stereo/SAP select signal SAP SET. The left (L) and right (R) channel signals output in response to the stereo/SAP select signal SAP SET are shown in TABLE 1.

TABLE 1

| SAP SET | L | R |
|---|---|---|
| L | STEREO-L | STEREO-R |
| H | L + R | SAP |

In a system for recording and reproducing the audio signal output from the MTS decoder, a high fidelity audio processor frequency modulates audio signals L and R of the MTS decoder, and left channel (L-CH) and right channel (R-CH) audio heads record the corresponding signals. As shown in TABLE 1, if L+R and SAP signals are selected by SAP SET, the signal recorded by the L-CH audio head is the L+R signal while the signal recorded by the R-CH audio head is the SAP signal. During reproduction, only the L+R signal is reproduced, which makes it impossible to playback the original stereo broadcast.

The present invention will now be described in detail while referring to FIGS. 3 and 4.

In FIG. 3, reference numeral 30 represents an input for receiving a demodulated signal from a tuner (not shown), 31 is first filter which advantageously may be a 4.5 MHz cut-off LPF, 32 is second filter which advantageously may be a 4.5 MHz cut-off HPF, 33 is a L+R detector, 34 is a de-emphasis/phase comparator, 35 is a matrix circuit, 36 is a L-R detector, 37 is an AM demodulator, 38 is a first dBX-NR decoder, 39 is a pilot detector, 41 is a R-CH MUTE controller, 42 is a SAP detector, 43 is a SAP discriminator, 44 is a FM demodulator, and 45 is a second dBX-NR decoder.

Referring to FIG. 3, first filter 31, second filter 32, L+R detector 33, de-emphasis/phase comparator 34, matrix circuit 35, L-R detector 36, AM demodulator 37, SAP detector 42, SAP discriminator 43, FM demodulator 44 perform the same functions as those described with respect to corresponding elements of FIG. 2. Further descriptions of these functions are omitted in the interest of brevity.

The two dBX-NR decoders 38 and 45 attenuate noise from demodulated signals 37a and 44a, respectively A R-CH MUTE controller 41 controls the operation of the first dBX-NR decoder 38 in response to the outputs of pilot detector 39 and SAP discriminator 43, by generating a R-CH MUTE control signal. Pilot detector 39 controls the operation of AM demodulator 37 in response to the presence or absence of a pilot signal and supplies a decision signal to R-CH MUTE controller 41. The L and R outputs of matrix 35, R-CH MUTE signal of R-CH MUTE controller 41 and BL output of second dBX-NR decoder 45, which are generated in response to the presence of absence of the stereo and SAP signals in the audio signals included in the IF signal, are shown in TABLE 2.

TABLE 2

| IF | | MTS DECODER OUTPUT | | | |
|---|---|---|---|---|---|
| STEREO | MULTI-VOICE | L | R | BL | R-CH MUTE |
| X | X | MONO | X | X | Don't Care |
| X | O | MONO | X | O | O |
| O | X | L | R | X | X |
| O | O | L | R | O | O |

The operation of R-CH MUTE controller 41 is shown in TABLE 3.

TABLE 3

| PILOT SIGNAL | SAP SIGNAL | R-CH MUTE |
|---|---|---|
| X | X | O |
| X | O | O |
| O | X | X |
| O | O | X |

FIG. 4 illustrates one embodiment of a circuit for simultaneously recording and reproducing stereo/multivoice signals, using the MTS decoder of FIG. 3.

In FIG. 4, reference numeral 50 represents a tuner, 51 is the MTS decoder of FIG. 3, 52 is a high fidelity audio processor, 53 is a L-CH head, 54 is a R-CH head, 55 is a normal audio processor, is a normal audio head, 57 is a R-CH switch, 58 is a normal audio switch, 59 is a BIL signal discriminator for determining the presence or absence of a BIL signal, 60 is an oscillator, 61 is a control pulse generator, 62 is a mixer, 63 is a control head, 64 is a frequency detector, 65 is a digitron, 66 is an audio selector, and 67 and 68 are R-CH audio switches.

Referring to FIG. 4, a tuner 50 converts a broadcast signal of a selected channel among broadcasting signals transmitted via an antenna into an demodulated signal. The input demodulated signal is supplied to a MTS decoder 51 which supplies the output signals shown in TABLE 2 to a high fidelity audio processor 52 and a normal audio processor 55, with respect to the kinds of audio signals included in the demodulated signal. High fidelity audio processor 52 frequency-modulates the input audio signals, supplies them to L-CH head 53 and R-CH head 54 and simultaneously supplies a stereo signal to audio output L-CH and R-CH jacks. The audio signals are frequency modulated and recorded by L-CH and R-CH heads 53 and 54 on the high fidelity audio track of a tape. Meanwhile, a normal audio processor 55 amplifies the input audio signal and supplies it to a normal audio head 56. The audio signal amplified by normal audio head 56 is recorded on the tape's normal audio track. R-CH head switch 57 is positioned between high fidelity audio processor 52 and R-CH head 54 and is controlled by the R-CH MUTE signal output from MTS decoder 51 to interrupt the transmission of the frequency modulated audio signal to R-CH head 54. R-CH audio switch 67, positioned between high fidelity audio processor 52 and R-CH audio output jack performs the same operation as that of R-CH head switch 57. A normal audio switch 58, positioned between MTS decoder 51 and normal audio processor 55, switches between the L and BIL outputs of MTS decoder 51 according to the output of a BIL signal discriminator 59 and supplies the result to normal audio processor 55. BIL signal discriminator 59 inspects the BIL output of MTS decoder 51 and supplies a signal 59a indicating the presence or absence the BIL signal to normal audio switch 58, an oscillator 60 and a digitron 65.

Oscillator 60 is controlled by BIL signal presence signal 59a to supply a signal having a predetermined frequency to a mixer 62. Mixer 62 mixes the signal output from oscillator 60 with a control pulse 61a output from a control pulse generator 61, and supplies the result to a control head 63. The mixed signal (the oscillation signal plus the control pulse) is recorded on the tape's control track by control head 63.

During reproduction, the oscillation signal is detected by a frequency detector 64 to discriminate the presence of the BL signal. During playback, frequency detector 64 inspects the signal from control head 63 so that, if the oscillation signal from oscillator 60 is present, another BIL signal presence signal 64a is sent to digitron 65. Digitron 65 receives a stereo signal presence signal 52a from high fidelity audio processor 52, and BIL signal presence signals 59a and 64a from BIL signal discriminator 59 and frequency detector 64, respectively, so as to enable digitron 65 to indicate the presence of stereo and multivoice signals to be displayed. A user's selection of stereo or multivoice is input by an audio selector 66 and sent to R-CH audio switch 68. During playback, R-CH audio switch 68 blocks the transmission of the audio signal supplied from normal audio processor 55 to the R-CH audio output in response to the signal from audio selector 66.

As described in detail above, the stereo/multivoice recording and reproducing apparatus of the present invention is able to simultaneously record the stereo and multivoice signals and to selectively reproduce the multivoice signal, thereby preserving the original sound of the multivoice signal transmitted from a station and allowing play back of the multivoice signal when desired.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. In a high fidelity video tape recorder having a tuner receiving multichannel television system signals including a stereo signal and a multivoice signal, a stereo/multivoice recording apparatus comprising a decoder for simultaneously demodulating said stereo signal and said multivoice signal included in a demodulated signal supplied from said tuner, wherein said decoder comprises:

a first filter for filtering a video frequency component including luminance and chrominance signals from an input demodulated signal;

a second filter for filtering a first frequency component including a stereo main signal, a stereo subsignal, a pilot signal and a second audio program signal from said input demodulated signal;

a first detector for extracting a second frequency component including the stereo main signal from the first frequency component output by said second filter;

a de-emphasis/phase comparator for demodulating the stereo main signal from the second frequency component output by said first detector to produce a demodulated stereo main signal;

a second detector for extracting a third frequency component including the stereo subsignal from the first frequency component output by said second filter;

an amplitude demodulator controlled in response to an initial pilot signal output by a pilot discriminator for demodulating the stereo subsignal from the third frequency component output by said second detector to produce a demodulated stereo subsignal;

a first noise reduction decoder for removing noise from the demodulated stereo subsignal output by said amplitude demodulator;

a matrix circuit for receiving the demodulated stereo subsignal output by said de-emphasis/phase comparator and said first noise reduction decoder so as to generate left and right channel stereo signals;

a second audio program detector for extracting a fourth frequency component including a second audio program signal from the first frequency output by said second filter;

a frequency demodulator for demodulating said second audio program signal output by said second audio program detector to produce a multivoice signal; and a second noise reduction decoder for removing noise from the multivoice signal output by said frequency demodulator.

2. The stereo/multivoice recording apparatus as claimed in claim 1, wherein said decoder further comprises a second audio program discriminator for inspecting the fourth frequency component output by said second audio program detector to generate a second audio program presence signal which shows the presence of said second audio program signal.

3. The stereo/multivoice recording apparatus as claimed in claim 1, wherein said pilot discriminator is operatively connected to said second filter and wherein said pilot signal discriminator further comprises means for inspecting the first frequency component output by said second filter and for supplying said amplitude demodulator with said initial pilot signal indicative of the presence of said pilot signal whereby said amplitude demodulator stops operating in response to the initial pilot signal output by said pilot discriminator.

4. The stereo/multivoice recording apparatus as claimed in claim 3, wherein said decoder further comprises a second audio program discriminator for inspecting the fourth frequency component output by said second audio program detector to generate a signal for indicating the presence of said second audio program signal.

5. The stereo/multivoice recording apparatus as claimed in claim 4, wherein said decoder further comprises a controller operatively connected to said second audio program detector and said pilot discriminator for generating a mute signal.

6. The stereo/multivoice recording apparatus as claimed in claim 3, further comprising a right channel head switch positioned between a high fidelity audio processor operatively connected to said decoder and said right channel head and controlled by said mute signal output by said decoder for interrupting transmission of a frequency modulated right channel stereo signal to said right channel head.

7. The stereo/multivoice recording apparatus as claimed in claim 5, further comprising a right channel audio switch positioned between a high fidelity audio processor operatively connected to said decoder and a right channel audio output element and controlled by the mute signal output from said decoder for interrupting transmission of an audio signal to said right channel audio output element.

8. In a high fidelity video tape recorder having a tuner receiving multichannel television system signals including a stereo signal and a multivoice signal, a stereo/multivoice recording apparatus comprising a decoder for simultaneously demodulating said stereo signal and said multivoice signal included in a demodulated signal supplied from said tuner, wherein said stereo signal includes a left channel stereo signal and further comprising:

a multivoice signal discriminator for inspecting the multivoice signal provided by said decoder and for generating a discriminator signal in response to the presence of the multivoice signal; and an audio signal switch positioned between said decoder and an audio processor for selecting one of said left channel stereo signal and said multivoice signal output by said decoder according to the output of said multivoice signal discriminator and for supplying the result to said audio processor.

9. The stereo/multivoice recording apparatus as claimed in claim 8, further comprising:

an oscillator controlled to oscillate in response to the discriminator signal output by said multivoice signal discriminator for generating an oscillation signal of a predetermined frequency; and a mixer for mixing said oscillation signal and a control pulse and for supplying the result to a control head.

10. In a high fidelity video tape recorder having a tuner receiving multichannel television system signals including a stereo signal and a multivoice signal, a stereo/multivoice recording apparatus comprising a decoder for simultaneously demodulating said stereo signal and said multivoice signal included in a demodulated signal supplied from said tuner, further comprising:

an oscillator controlled to oscillate by a discriminator signal output by a multivoice signal discriminator for generating an oscillation signal of a predetermined frequency; and a mixer for mixing said oscillation signal and a control pulse and for supplying the result to a control head.

11. In a high fidelity video tape recorder having a tuner receiving multichannel television system signals including a stereo signal and a multivoice signal, a stereo/multivoice recording apparatus comprising a decoder for simultaneously demodulating said stereo signal, a pilot signal and said multivoice signal included in a demodulated signal supplied from said tuner, wherein said decoder comprises:

a first filter for filtering a video frequency component including luminance and chrominance signals from an input demodulated signal;

a second filter for filtering a first frequency component including a stereo main signal, a stereo subsignal, a pilot signal and a second audio program signal from said input demodulated signal;

a first detector for extracting a second frequency component including the stereo main signal from the first frequency component output by said second filter;

a de-emphasis/phase comparator for demodulating the stereo main signal from the second frequency component output by said first detector produce a demodulated stereo main signal;

a second detector for extracting a third frequency component including the stereo subsignal from the first frequency component output by said second filter;

an amplitude demodulator controlled in response to an initial pilot signal output by a pilot discriminator for demodulating the stereo subsignal from the third frequency component output by said second detector to produce a demodulated stereo subsignal;

a first noise reduction decoder for removing noise from the demodulated stereo subsignal output by said amplitude demodulator;

a matrix circuit for receiving the demodulated stereo subsignal output by said de-emphasis/phase comparator and said first noise reduction decoder so as to generate left and right channel stereo signals;

a second audio program detector for extracting a fourth frequency component including a second audio program signal from the first frequency component output by said second filter;

a frequency demodulator for demodulating said second audio program signal output by said second audio program detector to produce a multivoice signal; and a second noise reduction decoder for removing noise from the multivoice signal output by said frequency demodulator.

12. The stereo/multivoice recording apparatus as claimed in claim 11, wherein said decoder further comprises a second audio program discriminator for inspecting the fourth frequency component output by said second audio program detector to generate a second audio program presence signal which shows the presence of said second audio program signal.

13. The stereo/multivoice recording apparatus as claimed in claim 11, wherein said pilot discriminator is operatively connected to said second filter and wherein said pilot signal discriminator further comprises means for inspecting the first frequency component output by said second filter and for supplying said amplitude demodulator with said initial pilot signal indicative of the presence of said pilot signal whereby said amplitude demodulator stops operating in response to the initial pilot signal output by said pilot discriminator.

14. The stereo/multivoice recording apparatus as claimed in claim 13, wherein said decoder further comprises a second audio program discriminator for inspecting the fourth frequency component output by said second audio program detector to generate a signal for indicating the presence of said second audio program signal.

15. The stereo/multivoice recording apparatus as claimed in claim 14, wherein said decoder further comprises a controller operatively connected to said second audio program detector and said pilot discriminator for generating a mute signal.

16. The stereo/multivoice recording apparatus as claimed in claim 15, further comprising a right channel head switch positioned between a high fidelity audio processor operatively connected to said decoder and said right channel head and controlled by said mute signal output by said decoder for interrupting transmission of a frequency modulated right channel stereo signal to said right channel head.

17. The stereo/multivoice recording apparatus as claimed in claim 15, further comprising a right channel audio switch positioned between a high fidelity audio processor operatively connected to said decoder and a right channel audio output element and controlled by the mute signal output from said decoder for interrupting transmission of an audio signal to said right audio output element.

18. In a high fidelity video tape recorder having a tuner receiving multichannel television system signals including a stereo signal and a multivoice signal, a stereo/multivoice recording apparatus comprising a decoder for simultaneously demodulating said stereo signal, a pilot signal and said multivoice signal included in a demodulated signal supplied from said tuner, wherein said stereo signal includes a left channel stereo signal and further comprising:
- a multivoice signal discriminator for inspecting the multivoice signal provided by said decoder and for generating a discriminator signal in response to the presence of the multivoice signal; and
- an audio signal switch positioned between said decoder and an audio processor for selecting one of said left channel stereo signal and said multivoice signal output by said decoder according to the output of said multivoice signal discriminator and for supplying the result to said audio processor.

19. The stereo/multivoice recording apparatus as claimed in claim 18, further comprising:
- an oscillator controlled to oscillate in response to the discriminator signal output by said multivoice signal discriminator for generating an oscillation signal of a predetermined frequency; and
- a mixer for mixing said oscillation signal and a control pulse and for supplying the result to a control head.

20. In a high fidelity video tape recording having a tuner receiving multichannel television system signals including a stereo signal and a multivoice signal, a stereo/multivoice recording apparatus comprising a decoder for simultaneously demodulating said stereo signal, a pilot signal and said multivoice signal included in a demodulated signal supplied from said tuner, further comprising:
- an oscillator controlled to oscillate by a discriminator signal output by a multivoice signal discriminator for generating an oscillation signal of a predetermined frequency; and
- a mixer for mixing said oscillation signal and a control pulse and for supplying the result to a control head.

* * * * *